(12) United States Patent
Iqbal et al.

(10) Patent No.: US 7,955,496 B2
(45) Date of Patent: Jun. 7, 2011

(54) SYSTEMS AND METHODS FOR UPGRADING HYDROCARBONS

(75) Inventors: Rashid Iqbal, Houston, TX (US); Ravindra K. Agrawal, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 357 days.

(21) Appl. No.: 12/107,608

(22) Filed: Apr. 22, 2008

(65) Prior Publication Data

US 2009/0261017 A1    Oct. 22, 2009

(51) Int. Cl.
*C10G 9/36* (2006.01)
(52) U.S. Cl. .................. 208/129; 208/106; 208/128
(58) Field of Classification Search .......... 208/49, 208/67, 106–109, 125–126, 128–129, 152; 502/20, 34, 38–39, 50–52
See application file for complete search history.

(56) References Cited

U.S. PATENT DOCUMENTS

| | | | |
|---|---|---|---|
| 4,075,079 A * | 2/1978 | Lang .................. | 48/210 |
| 4,316,794 A * | 2/1982 | Schoennagel ........... | 208/111.15 |
| 4,440,632 A | 4/1984 | Vasalos et al. | |
| 4,859,315 A | 8/1989 | Bartholic | |
| 4,872,971 A | 10/1989 | Zandona | |
| 5,447,702 A | 9/1995 | Campbell et al. | |
| 5,578,093 A | 11/1996 | Campbell et al. | |
| 6,171,473 B1 | 1/2001 | Fornoff | |
| 6,773,630 B2 | 8/2004 | Stellaccio et al. | |
| 6,974,842 B1 | 12/2005 | Spena et al. | |
| 2006/0076275 A1 | 4/2006 | Smith | |

OTHER PUBLICATIONS

Davis, et al. Technology Development for Iron and Cobalt Fischer-Tropsch Catalysts Quarterly Report, Oct. 1, 1998-Dec. 31, 1998, University of Kentucky Research Foundation [online], Jan. 30, 1999, Retrieved from the internet: http://crtc.caer.uky.edu/pubs/qurepts/40308r01.pdf.

* cited by examiner

*Primary Examiner* — Walter D Griffin
*Assistant Examiner* — Brian McCaig
(74) *Attorney, Agent, or Firm* — KBR IP Legal Dept.

(57) ABSTRACT

Systems and methods for upgrading hydrocarbons are provided. A portion of a hydrocarbon can be vaporized in the presence of gasified hydrocarbons, combustion gas, and solids to provide a vaporized gas. A portion of the hydrocarbon can be cracked in the presence of the gasified hydrocarbons, the combustion gas, and the solids to provide a cracked gas. A portion of the hydrocarbon can be deposited onto the solids to provide hydrocarbon containing solids. At least a portion of the hydrocarbon containing solids can be selectively separated to provide separated hydrocarbon containing solids and a hot gas product. The hot gas product can be at a temperature of from about 400° C. to about 1,650° C. A portion of the hydrocarbon containing solids can be combusted in the presence of an oxidant to provide the combustion gas. A portion of the hydrocarbon containing solids can be gasified to provide the gasified hydrocarbon.

23 Claims, 4 Drawing Sheets

SYSTEMS AND METHODS FOR UPGRADING HYDROCARBONS

BACKGROUND

1. Field

The present embodiments generally relate to methods for upgrading hydrocarbons. More particularly, embodiments of the present invention relate to methods for vaporizing, cracking, combusting, and gasifying hydrocarbons to provide hydrocarbon products and synthesis gas.

2. Description of the Related Art

Gasification is a high-temperature process usually conducted at elevated pressure to convert carbon-containing feeds into a synthesis gas ("syngas"), which is primarily hydrogen, carbon monoxide, and carbon dioxide. Syngas can be used as a fuel to generate electricity or steam, as a source of hydrogen, and as a feedstock for the synthesis of hydrocarbon products.

Typical hydrocarbons used in gasification processes include petroleum-based materials that are neat or residues of processing materials, such as heavy crude oil, bitumen, tar sands, coal, kerogen, oil shale, coke, and other high-sulfur and/or high metal-containing residues, gases, and various carbonaceous waste materials. The hydrocarbon is reacted in the gasifier in a reducing (oxygen-starved) atmosphere at high temperature and usually moderate to high pressure. The resulting syngas typically contains about 85 percent of the feed carbon content as carbon monoxide, with the balance being a mixture of carbon dioxide and methane.

Conventional gasification techniques prevent simultaneous production of more valuable lighter hydrocarbon products (e.g. $C_1$-$C_{20}$) in addition to syngas as the hydrocarbons are gasified to hydrogen and carbon oxides. There is a need therefore, for improved systems and methods to upgrade carbon-containing materials using gasification to produce both syngas and light hydrocarbon products (e.g. $C_1$-$C_{20}$).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for upgrading hydrocarbons are provided. In one or more embodiments, a portion of a hydrocarbon can be vaporized in the presence of gasified hydrocarbons, combustion gas, and solids to provide a vaporized gas. In one or more embodiments, a portion of the hydrocarbon can be cracked in the presence of the gasified hydrocarbons, the combustion gas, and the solids to provide a cracked gas. In one or more embodiments, a portion of the hydrocarbon can be deposited onto the solids to provide hydrocarbon containing solids. In one or more embodiments, at least a portion of the hydrocarbon containing solids can be selectively separated to provide separated hydrocarbon containing solids and a hot gas product. In one or more embodiments, the hot gas product can include, but is not limited to the vaporized gas, the cracked gas, the gasified hydrocarbons, and the combustion gas. In one or more embodiments, the hot gas can be at a temperature of from about 400° C. to about 1,650° C. In one or more embodiments, a portion of the hydrocarbon containing solids can be combusted in the presence of an oxidant to provide the combustion gas. In one or more embodiments, a portion of the hydrocarbon containing solids can be gasified to provide the gasified hydrocarbons. In one or more embodiments, the gasified hydrocarbons can include, but are not limited to, hydrocarbons, hydrogen, carbon monoxide, and carbon dioxide.

Figure 1:
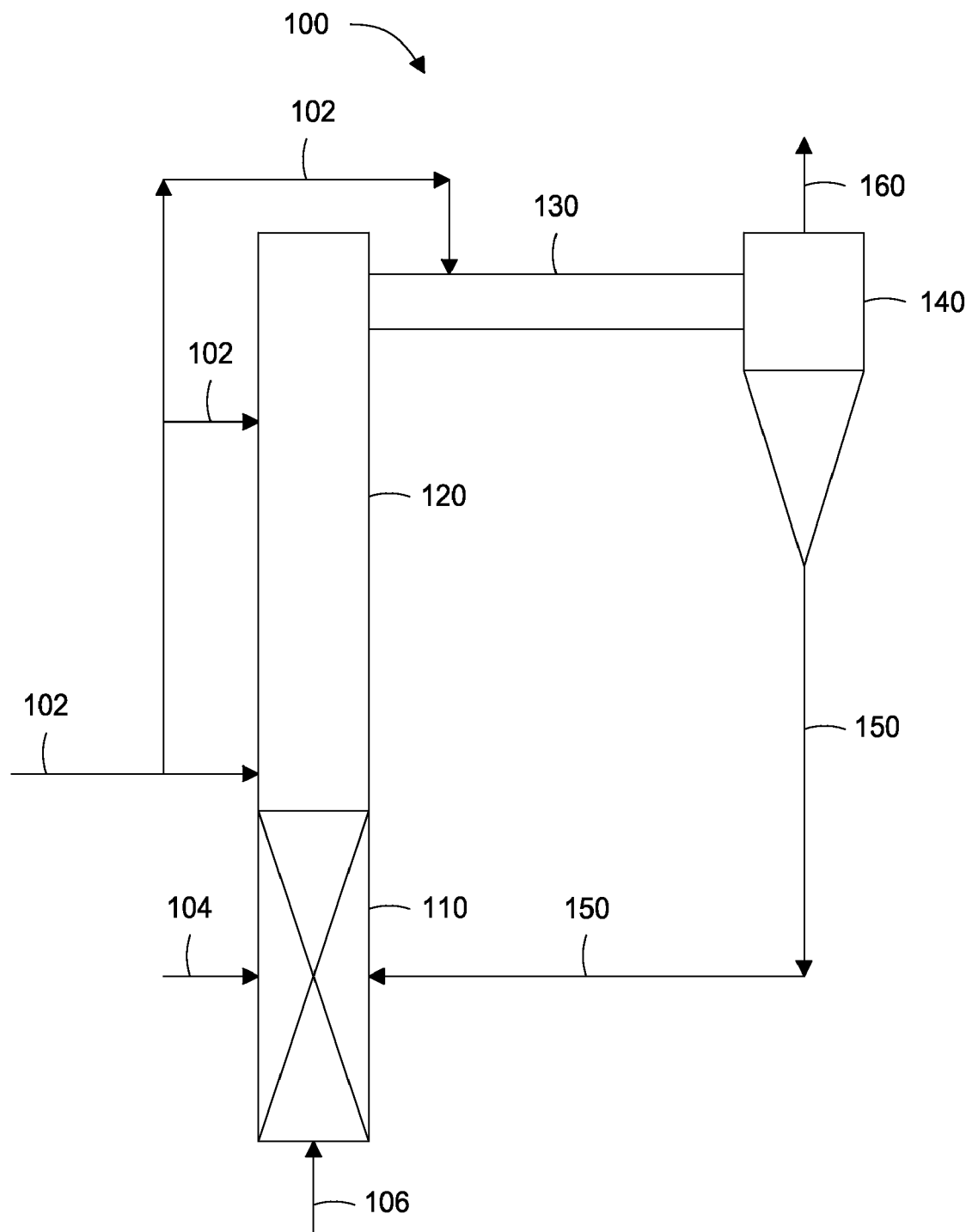
FIG. 1 depicts an illustrative gasifier for upgrading a hydrocarbon according to one or more embodiments described.

FIG. 1 depicts an illustrative gasifier for upgrading a hydrocarbon according to one or more embodiments. The gasifier 100 can include one or more oxidation zones 110, one or more gasification zones 120, one or more transition lines or transfer lines 130, one or more separators or separation zones 140, and one or more J-legs or recycle lines 150. In one or more embodiments, the oxidation zones 110 and gasification zones 120 can be arranged in any order, configuration and/or frequency. In one or more embodiments, the zones 110, 120 can be disposed vertically, with the gasification zone 120 disposed above the oxidation zone 110.

In one or more embodiments, a hydrocarbon via line 102 can be introduced to the gasification zone 120 and/or the transfer line 130. In one or more embodiments, the hydrocarbon introduced via line 102 to the gasification zone 120 can be partially or completely vaporized and/or cracked. In one or more embodiments, lighter hydrocarbons, for example $C_1$-$C_{12}$ hydrocarbons, can vaporize to provide gaseous hydrocarbons. In one or more embodiments, at least a portion of the hydrocarbons can crack or convert to one or more lighter hydrocarbon products. For example, heavier hydrocarbons, such as $C_{12}$-$C_{20}$ and higher hydrocarbons, can crack to provide lighter hydrocarbon gases. In one or more embodiments, the vaporization and cracking can both occur within the gasification zone 120 and/or the transition line 130. In one or more embodiments, at least a portion of the heat required for the vaporization and/or cracking can be provided by combusting ("oxidizing") a portion of a plurality of hydrocarbon containing solids ("coke-covered solids)" introduced via line 150 to the oxidation zone 110.

In one or more embodiments, the hydrocarbon in line 102 can include, but is not limited to, one or more carbon-containing materials. The carbon-containing materials can include but are not limited to, whole crude oil, crude oil, vacuum gas oil, heavy gas oil, residuum, atmospheric tower bottoms, vacuum tower bottoms, distillates, paraffins, aromatic rich material from solvent deasphalting units, aromatic hydrocarbons, naphthenes, oil shales, oil sands, tars, bitumens, kerogen, waste oils, derivatives thereof, or mixtures thereof. In one or more embodiments, the hydrocarbon in line 102 can have an API Gravity at 15.6° C. ranging from a low of about −12, about 0, about 5, or about 10 to a high of about 20, about 25, about 30, or about 35. In one or more embodiments, the hydrocarbon in line 102 can have an API Gravity at 15.6° C. of from about −12 to about 20, or from about 5 to about 23, or from about 10 to about 30. In one or more embodiments, the paraffin content of the hydrocarbon in line 102 can range from a low of about 30% vol, about 35% vol, or about 40% vol to a high of about 55% vol, about 60% vol, or about 65% vol. In one or more embodiments, the aromatic hydrocarbon content of the hydrocarbon in line 102 can range from a low of about 2% vol, about 7% vol, or about 12% vol to a high of about 20% vol, about 50% vol, or about 80% vol. In one or more embodiments, the naphthene content of the hydrocarbon in line 102 can range from a low of about 0% vol, about 10% vol, or about 20% vol to a high of about 25% vol, about 30% vol, or about 35% vol. In one or more embodiments, the hydrocarbon in line 102 can have a carbon to hydrogen (C:H) ratio of from about 0.8:1, about 1:1, about 1:1.1, about 1:1.2, about 1:1.3, or about 1:1.4.

In one or more embodiments, the hydrocarbon in line 102 can be mixed with one or more carrier fluids, e.g. carbon dioxide, water, syngas, light hydrocarbons, such as gas oils, slurry oils, naphtha, distillate, cycle oils, crude oils, or any other suitable carrier fluid. In one or more embodiments, the hydrocarbon in line 102 can be mixed with one or more sorbents. The sorbents can be added to capture contaminants within the gasifier 100, such as oxygen and/or sodium vapor in the gas phase. In one or more embodiments, one or more sorbents can be added to the hydrocarbon in line 102 and/or the gasifier 100 to limit the oxygen concentration to levels below the threshold required to support uncontrolled reactions with hydrogen. The one or more sorbents can include an ash containing reactive carbon which, by reacting to form carbon monoxide and/or carbon dioxide, can chemically bond with residual oxygen present in the gasification zone 120 and/or transition line 130. In one or more embodiments, the hydrocarbon in line 102 can be mixed with one or more chemicals to reduce coking, fouling, corrosion, sedimentation, agglomeration, and the like. In one or more embodiments, the sorbents can be ground to an average particle size of about 5 μm to about 100 μm, or about 10 μm to about 75 μm prior to mixing with the hydrocarbon in line 102 or introduction directly to the gasifier 100. Illustrative sorbents can include, but are not limited to, carbon rich ash, limestone, dolomite, coke breeze, and mixtures thereof. Residual sulfur released from the asphaltene-rich mixture can be captured by native calcium in the feed or by a calcium-based sorbent to form calcium sulfide.

In one or more embodiments, an oxidant can be introduced via line 106 to the oxidation zone 110. In one or more embodiments, the amount of oxidant introduced via line 106 to the oxidation zone 110 can range from about 1% to about 90% of the stoichiometric oxygen required to oxidize the total amount of hydrocarbons in the hydrocarbon containing solids. In one or more embodiments, the oxygen concentration within the oxidation zone 110 can range from a low of about 1%, about 3%, about 5%, or about 7% to a high of about 20%, about 30%, about 40%, or about 50% of stoichiometric requirements based on the molar concentration of carbon in the oxidation zone 110. In one or more embodiments, the oxygen concentration within the oxidation zone 110 can range from a low of about 0.5%, about 2%, about 6%, or about 10% to a high of about 60%, about 70%, about 80%, or about 90% of stoichiometric requirements based on the molar concentration of carbon in the oxidation zone 110.

A portion of the coke-covered solids introduced via line 150 to the oxidation zone 110 can be combusted to provide a combustion gas and heat. The combustion gas can include, but is not limited to carbon monoxide, carbon dioxide, and water. In one or more embodiments, after partially combusting a portion of the coke-covered solids at least a portion of the non-combusted coke-covered solids can be gasified within the gasification zone 120 to provide a syngas and regenerated solids. The syngas can include, but is not limited to hydrogen, carbon monoxide, and carbon dioxide. In one or more embodiments, steam via line 104 can be introduced to the combustion zone 110. The steam introduced via line 104 can provide control of the temperature generated within the oxidation zone 110 from combusting a portion of the coke-covered solids. In one or more embodiments, the steam introduced via line 104 can react with hydrocarbons to provide syngas. In one or more embodiments, one parameter that can control or otherwise adjust the composition of the hot gas product in line 160 can be the amount of steam introduced via line 104 to the gasifier 200, i.e. the oxidation zone 110, the gasification zone 120, and/or the transition line 130. In one or more embodiments, less steam or the absence of steam can provide an increased amount of vaporized and cracked hydrocarbon gases in the hot gas product recovered via line 160 relative to a higher amount of steam.

In one or more embodiments, the oxidant via line 106 can include, but is not limited to, air, oxygen, essentially oxygen, oxygen-enriched air, mixtures of oxygen and air, mixtures of oxygen and inert gas such as nitrogen and argon, and combinations thereof. In one or more embodiments, the steam via line 104 can be any suitable type of steam, for example low pressure steam, medium pressure steam, high pressure steam, or superheated steam.

In one or more embodiments, the hydrocarbon via line 102, the oxidant via line 106, the coke-covered solids via line 150, and/or the steam via line 104 can be introduced simultaneously, sequentially, alternatively, or any combination thereof, to the gasifier 100 based upon operating conditions within the oxidation zone 110 and the desired finished products.

In one or more embodiments, the hydrocarbon introduced via line 102 to the gasification zone 120 can be heated to temperatures of more than about 400° C., more than about 550° C., more than about 750° C., more than about 1,000° C., more than about 1,250° C., more than about 1,400° C., or more than about 1,650° C. In one or more embodiments, the temperature of the gasification zone 120 can range from a low of about 400° C., about 500° C., about 700° C., about 900° C., or about 1,000° C. to a high of about 1,250° C., about 1,350° C., about 1,450° C., about 1,550° C., or about 1,650° C. In one or more embodiments, the residence time of the hydrocarbons can be adjusted to optimize the recovery of hydrocarbons based upon the corresponding temperature within the gasification zone 120. For example, a gasification zone operating at 1,650° C. can have a shorter residence time than a gasification zone operating at 850° C. The time required for the hydrocarbons to vaporize and/or crack can be less for a gasification zone operating at a high temperature, for example 1,650° C., than the time required for vaporization and/or cracking for a gasification zone operating at a much lower temperature, for example, 850° C.

In one or more embodiments, the residence time of the hydrocarbon introduced via line 102 to the gasification zone 120 can range from about 1 millisecond ("ms") to about 15 seconds ("s"). In one or more embodiments, the residence time of the hydrocarbon introduced via line 102 to the gasification zone 120 can range from a low of about 50 ms, about 100 ms, about 150 ms, or about 200 ms to a high of about 1 s, about 3 s, about 5 s, or about 8 s. The residence time of the hydrocarbon introduced via line 102 to the gasification zone 120 can be controlled or otherwise adjusted by introducing the hydrocarbon further downstream from the oxidation zone 110. For example, introducing the hydrocarbon just downstream the oxidation zone 110 will provide a longer residence time than introducing the hydrocarbon to the transition line 130.

In one or more embodiments, at least a portion of the hydrocarbon introduced via line 102 can deposit as a layer of carbonaceous coke on the regenerated solids present in the hot gas to provide the coke-covered solids. The hydrocarbons that deposit on the solids can be liquid hydrocarbons, solid hydrocarbons, or both. In one or more embodiments, the vaporizing, cracking, and depositing of the hydrocarbons present in the second portion introduced via line 150 to the gasification zone 120 can all occur within the gasification zone. In one or more embodiments, a hot gas mixture, which can include the combustion gas, vaporized hydrocarbons, cracked hydrocarbons, and hydrocarbon containing solids can be recovered via line 160 from the gasifier 100 as a hot gas product. In one or more embodiments, the hydrocarbon containing solids can be selectively separated from the hot gas mixture using the one or more separators 140 to provide a solids-lean hot gas product via line 160 and the hydrocarbon containing solids via line 150.

In one or more embodiments, about 20% wt, 30% wt, 40% wt, 50% wt, 60% wt, 70% wt or more of the hydrocarbon introduced via line 102 to the gasification zone 120 can vaporize and/or crack. In one or more embodiments, the percent of the hydrocarbons introduced via line 102 to the gasification zone 120 that can vaporize and/or crack can range from a low of about 2% wt, about 5% wt, about 10% wt, or about 15% wt to a high of about 30% wt, about 40% wt, about 50% wt, or about 60% wt. In one or more embodiments, from about 2% wt to about 10% wt, from about 20% wt to about 50% wt, from about 30% wt to about 60% wt, or from about 40% wt to about 60% wt of the hydrocarbons introduced via line 102 to the gasification zone 120 can vaporize and/or crack. In one or more embodiments, the percent of the $C_1$-$C_3$ hydrocarbons introduced via line 102 that can vaporize and/or crack can be about 1% or more, about 3% or more, about 5% or more, about 10% or more. In one or more embodiments, the percent of the $C_4$-$C_6$ hydrocarbons introduced via line 102 that can vaporize and/or crack can be about 1% or more, about 5% or more, about 10% or more, or about 15% or more. In one or more embodiments, the percent of the $C_7$-$C_9$ hydrocarbons introduced via line 102 that can vaporize and/or crack can be about 1% vol or more, about 3% vol or more, about 5% vol or more, or about 10% vol or more.

The hot gas product in line 160 can include, but is not limited to naphthas, distillates, gas oils, $C_1$ to $C_{20}$ hydrocarbon compounds, carbon monoxide, carbon dioxide, hydrogen, water vapor, coke-covered solids, derivatives thereof, and mixtures thereof. In one or more embodiments, the hot gas product in line 160 can be selectively separated to provide one or more products, for example a naphtha product, a distillate product, a gas oil product, and a syngas product, which can include hydrogen, carbon monoxide, and carbon dioxide. In one or more embodiments, the naphtha concentration in the hot gas product in line 160 can range from about 1% vol to about 40% vol, about 2% vol to about 35% vol, about 3% vol to about 30% vol, about 4% vol to about 25% vol, or about 5% vol to about 20% vol. In one or more embodiments, the distillate concentration in the hot gas product in line 160 can range from about 1% vol to about 40% vol, about 2% vol to about 35% vol, about 3% vol to about 30% vol, about 4% vol to about 25% vol, or about 5% vol to about 20% vol. In one or more embodiments, the gas oil concentration in the hot gas product in line 160 can range from about 1% vol to about 40% vol, about 2% vol to about 35% vol, about 3% vol to about 30% vol, about 4% vol to about 25% vol, or about 5% vol to about 20% vol.

In one or more embodiments, the $C_1$-$C_3$ concentration in the hot gas product in line 160 can range from about 1% vol to about 95% vol, about 10% vol to about 90% vol, about 20% vol to about 80% vol, about 30% vol to about 70% vol, or about 30% vol to about 60% vol. In one or more embodiments, the $C_4$-$C_6$ concentration in the hot gas product in line 160 can range from about 5% vol to about 95% vol, about 10% vol to about 90% vol, about 20% vol to about 80% vol, about 30% vol to about 70% vol, or about 30% vol to about 60% vol. In one or more embodiments, the $C_7$-$C_9$ concentration in the hot gas product in line 160 can range from about 1% vol to about 50% vol, about 2% vol to about 45% vol, about 3% vol to about 40% vol, about 4% vol to about 35% vol, or about 5% vol to about 30% vol. In one or more embodiments, the $C_{10}$-$C_{12}$ concentration in the hot gas product in line 160 can range from about 1% vol to about 40% vol, about 2% vol to about 35% vol, about 3% vol to about 30% vol, about 4% vol to about 25% vol, or about 5% vol to about 20% vol.

In one or more embodiments, the carbon monoxide concentration in the hot gas product in line 160 can range from about 0.1% vol to about 50% vol, about 1% vol to about 45% vol, about 2% vol to about 40% vol, about 3% vol to about 35% vol, or about 4% vol to about 30% vol. In one or more embodiments, the carbon dioxide concentration in the hot gas product in line 160 can range from about 1% vol to about 50% vol, about 2% vol to about 45% vol, about 3% vol to about 40% vol, about 4% vol to about 35% vol, or about 5% vol to about 30% vol. In one or more embodiments, the water concentration in the hot gas product in line 160 can range from about 1% vol to about 50% vol, about 2% vol to about 45% vol, about 3% vol to about 40% vol, about 4% vol to about 35% vol, or about 5% vol to about 30% vol.

In one or more embodiments, the temperature of the hot gas product in line 160 can range from a low of about 400° C., about 500° C., about 600° C., or about 700° C. to a high of about 1,200° C., about 1,500° C., about 1,600° C., or about 1,650° C. The pressure of the hot gas product in line 160 can range from about 101 kpa to about 10,400 kpa, about 200 kpa to about 9,380 kpa, about 300 kpa to about 8,350 kpa, or about 400 kpa to about 6,975 kpa.

In one or more embodiments, the one or more solids or transport mediums can be, but are not limited to refractory oxides, such as alumina, alpha alumina, zirconia, titania, hafnia, silica, or mixtures thereof; rare earth modified refractory metal oxides, where the rare earth may be any rare earth metal (e.g. lanthanum or yttrium); alkali earth metal modified refractory oxides; ash; derivatives thereof, or mixtures thereof. The transport media can be categorized as materials having a substantially stable surface area at reaction conditions, for example, a surface area that is not substantially reactive at the operating conditions, e.g. temperature and pressure.

Although not shown, the hydrocarbon containing solids in line 150 can be stripped to remove entrained volatile hydrocarbons. For example, the hydrocarbon solids can be steam stripped or stripped with other suitable media to remove at least a portion of any entrained volatile hydrocarbons. Entrained volatile hydrocarbons can include, for example $C_1$-$C_{12}$ hydrocarbons.

In one or more embodiments, the one or more gasifiers 100 can include any gasifier known in the art suitable for gasification of one or more hydrocarbon feedstocks. In addition to the oxidation zone and gasification zones previously discussed, in one or more embodiments, the gasifier 100 can include an intermediate reduction zone disposed between the oxidation and gasification zones. In one or more embodiments, the gasifier 100 can include one or more types of gasifiers, including, but not limited to, updraft, downdraft, counter-current, co-current, cross-draft, fluidized bed, double-fired, entrained bed and molten-bath type gasifiers. In one or more embodiments, the gasifier 100 can incorporate one or more efficiency improvement features, including, but not limited to, plug flow, rapid-mix multi-port feed injection, cooled walls, or any combination of technologies to enhance gasification efficiency. The operating temperature of the gasifier 100 can range from a low of about 400° C., about 500° C., about 600° C., or about 700° C. to a high of about 1,200° C., about 1,400° C., about 1,500° C., or about 1,650° C. The operating pressure of the gasifier 100 can range from about 101 kPa to about 10,400 kPa, about 200 kPa to about 9,380 kPa, about 300 kPa to about 8,350 kPa, or about 400 kPa to about 6,975 kPa.

In one or more embodiments, the one or more separators 140 can include any system, device, or combination of systems and/or devices capable of providing an outlet particulate concentration less than about 10,000 ppmw, about 1,000 ppmw, about 500 ppmw, about 250 ppmw, about 100 ppmw, about 50 ppmw, about 10 ppmw, about 1 ppmw, or about 0.1 ppmw. In one or more embodiments, the one or more separators 140 can include one or more cyclonic and/or gravity separators arranged in series or in parallel. In one or more embodiments, the one or more separators 140 can include one or more high throughput, low efficiency and/or high efficiency cyclonic separators. In one or more embodiments, the separators 140 can include one or more particulate control devices ("PCDs"). Illustrative PCDs can include, but are not limited to, electrostatic precipitators, sintered metal filters, metal filter candles, and/or ceramic filter candles (for example, iron aluminide filter material).

Figure 2:
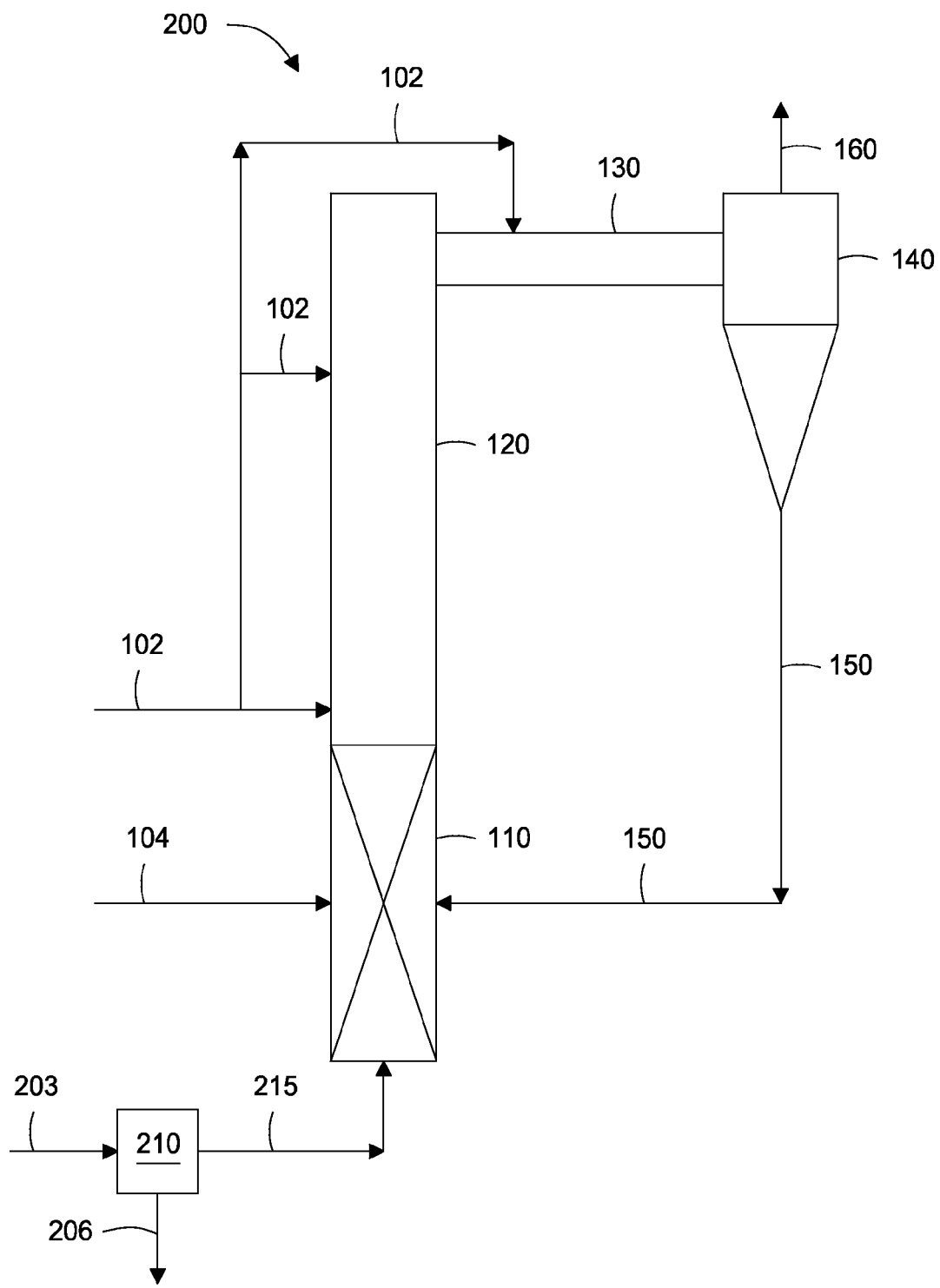
FIG. 2 depicts another illustrative gasifier for upgrading a hydrocarbon according to one or more embodiments described.

FIG. 2 depicts another illustrative gasifier 200 for upgrading a hydrocarbon according to one or more embodiments. In one or more embodiments, the gasifier 200 can be as discussed and described above with reference to FIG. 1. In one or more embodiments, the gasifier 200 can further include one or more air separation units ("ASU") 210 to provide an oxygen rich gas via line 215, which can be introduced to the oxidation zone 110.

In one or more embodiments, pure oxygen, nearly pure oxygen, essentially oxygen, or oxygen-enriched air from the ASU 210 can be supplied to the oxidation zone via line 215. The ASU 210 can provide a nitrogen-lean, oxygen-rich feed via line 215 to the oxidation zone 110, thereby minimizing the nitrogen concentration in the hot gas product provided via line 160. The use of a pure or nearly pure oxygen feed allows the gasifier 200 to produce a syngas via line 160 that can be essentially nitrogen-free. An essentially nitrogen-free gas can contain less than about 2% vol, less than about 1% vol, or less than about 0.5% vol nitrogen/argon.

In one or more embodiments, the ASU 210 can be a high-pressure, cryogenic type separator. In one or more embodiments, the ASU 210 can be a non-cryogenic type separator. For example, non-cryogenic type air separation units can be based on adsorption systems or membrane diffusion-separation systems. Air can be introduced to the ASU 210 via line 203. The separated nitrogen via line 206 from the ASU 210 can be added to a combustion turbine, disposed of, or used as utility.

In one or more embodiments, the oxygen content of the oxidant introduced via line 215 can be about 21% vol or more, about 25% vol or more, about 30% vol or more, about 40% vol or more, about 50% vol or more, about 60% vol or more, or about 70% vol or more. In one or more embodiments, the oxygen content of the oxidant introduced via line 215 can be about 80% vol or more, about 90% vol or more, about 95% vol or more, about 97% vol or more, or about 98% vol or more. In one or more embodiments, the oxidant introduced via line 215 can be about 99% vol or more, about 99.5% vol or more, about 99.9% vol or more, or about 99.99% vol or more.

Figure 3:
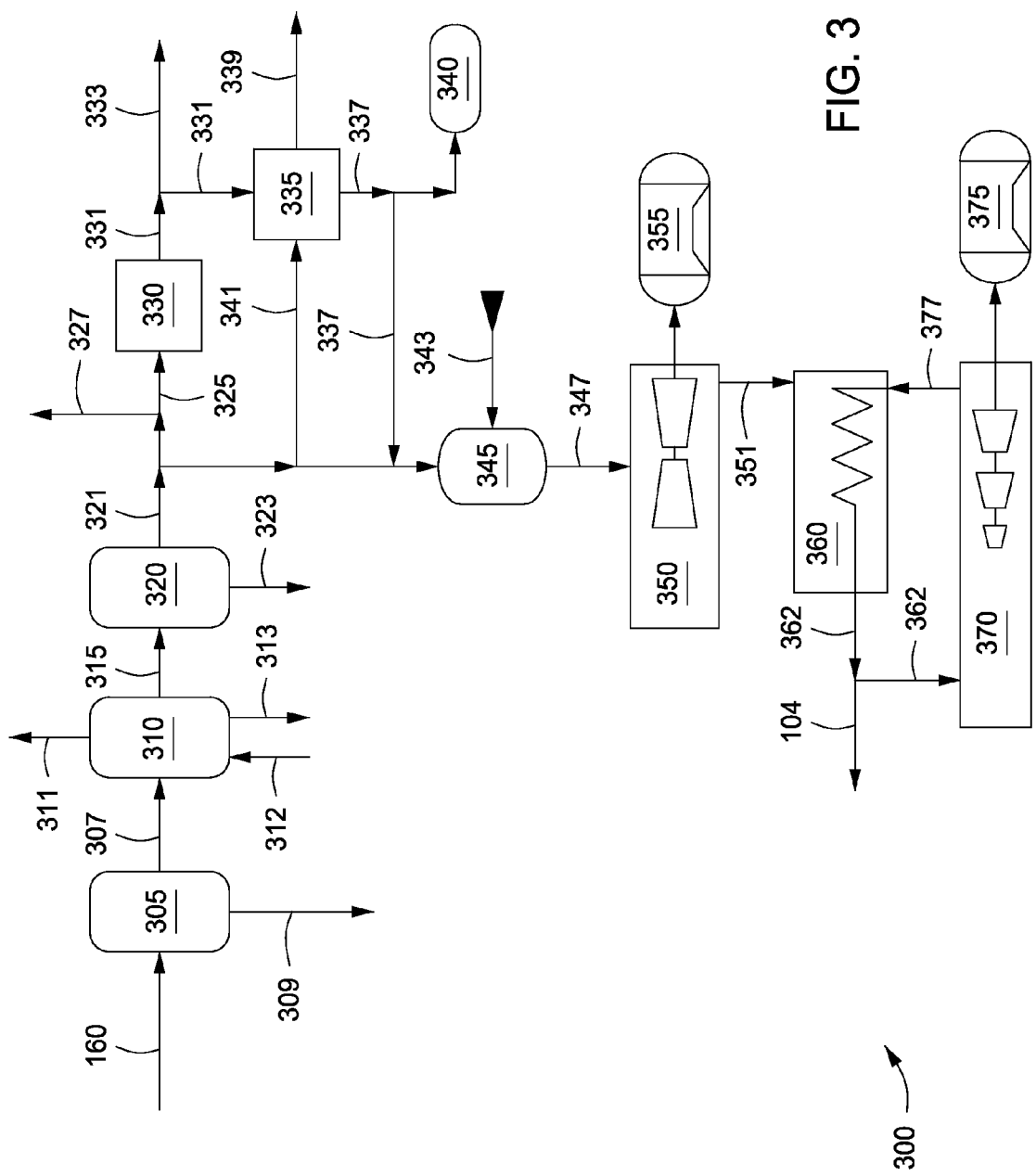
FIG. 3 depicts an illustrative hydrocarbon upgrading system according to one or more embodiments described.

FIG. 3 depicts an illustrative hydrocarbon upgrading system 300 according to one or more embodiments. In one or more embodiments, a hot product gas via line 160 can be introduced to the hydrocarbon upgrading system 300. The hot product gas via line 160 can be as discussed and described above with reference to FIGS. 1 and 2. In one or more embodiments, the hydrocarbon upgrading system 300 can include one or more particulate removal systems 305, one or more product separation and cooling systems 310, and one or more syngas purification systems 320. In one or more embodiments, the hydrocarbon upgrading system 300 can include one or more gas converters 330 to convert at least a portion of the product gas (e.g. the syngas) to one or more Fischer-Tropsch products, methanol, ammonia, chemicals, derivatives thereof, and combinations thereof. In one or more embodiments, the hydrocarbon upgrading system 300 can include one or more hydrogen separators 335, one or more fuel cells 340, one or more combustors 345, one or more gas turbines 350, one or more waste heat boilers 360, one or more steam turbines 370, one or more generators 355, 375. In one or more embodiments, the oxidant introduced to the gasifier via line 106 or 215 can be as discussed and described above with reference to FIGS. 1 and 2. In one or more embodiments, the hot product gas via line 160 can be as discussed and described above with reference to FIGS. 1 and 2.

As described and discussed above in reference to FIG. 1, the one or more products provided by the gasifier 100 and recovered via line 160 can contain hydrocarbon gases and syngas. In one or more embodiments, the one or more products can be introduced via line 160 to one or more particulate removal systems 305, which can be used to partially or completely remove solids from the one or more products to provide separated solids via line 309 and solids-lean products via line 307. In one or more embodiments, the separated solids can be purged via line 309 from the system or recycled to the gasifier (not shown).

In one or more embodiments, the one or more particulate removal systems 305 can include one or more separation devices such as conventional disengagers and/or cyclones (not shown). Particulate control devices ("PCD") capable of providing an outlet particulate concentration below the detectable limit of about 0.1 ppmw can also be used. Illustrative PCDs can include, but are not limited to, electrostatic precipitators, sintered metal filters, metal filter candles, and/ or ceramic filter candles (for example, iron aluminide filter material). Although not shown, in one or more embodiments, the one or more products via line 160 can be introduced to the one or more product separation and cooling systems 310 prior to the particulate removal system 305. In one or more embodiments, the separator 140 discussed and described above in reference to FIGS. 1 and 2 can provide a hot gas product via line 160 that can be suitable for upgrading in the hydrocarbon upgrading system 300 without requiring additional separation in the particulate removal system 305.

In one or more embodiments, the solids-lean products via line 307 and/or via line 160 (not shown) can be introduced to the one or more product separation and cooling systems 310 to provide hydrocarbon products via line 311 and syngas via line 315. The hydrocarbon products in line 311 can be as discussed and described above with reference to FIGS. 1 and 2. In one or more embodiments, the hydrocarbon products via line 311 can include, but are not limited to ethane, ethylene, propane, propylene, butane, butene, pentane, pentene, hexane, hexene, heptane, and heptene. In one or more embodiments, the hydrocarbon products can be separated from the syngas, but otherwise mixed and recovered via line 311. In one or more embodiments, the hydrocarbon products in line 311 can be recovered separately via multiple lines 311, not shown. For example one independent line for each separate hydrocarbon product or separate mixtures of hydrocarbon products.

In one or more embodiments, the syngas via line 315 can include hydrogen, carbon monoxide, and carbon dioxide. In one or more embodiments, the syngas in line 315 can include nitrogen, for example air can be used as the oxidant in the gasifier. Nitrogen present in the syngas can be beneficial if the end products produced with the syngas require nitrogen, such as ammonia or urea production. In one or more embodiments, contaminants such as sulfur, mercury can be present in the syngas.

The product separation and cooling system 310 can include one or more distillation columns, membrane separation units, wash columns, fractionators, or any other suitable device, system, or combination of devices and/or systems that can provide one or more separated hydrocarbon products via line 311 and syngas via line 315.

In one or more embodiments, the product separation and cooling system 310 can include one or more coolers. In one or more embodiments, the cooler can cool the solids-lean products introduced via line 307 and/or line 160 using non-contact heat exchange with a cooling medium, for example boiler feed water introduced via line 312 and recovered as steam via line 313. In one or more embodiments, the cooler can provide low pressure steam, medium pressure steam, high pressure steam, superheated steam, or any combination thereof.

In one or more embodiments, the cooler can cool the solids-lean hydrocarbon products using contact cooling wherein the solids-lean hydrocarbon products can be mixed directly with the cooling medium, such as water or other suitable quench fluid. In one or more embodiments, the cooler can indirectly cool the solids-lean hydrocarbon products to provide steam via line 313 and cooled hydrocarbon products. In one or more embodiments, the solids-lean hydrocarbon products in line 307 can be cooled to about 500° C. or less, 400° C. or less, 300° C. or less, 200° C. or less, or 150° C. or less using the one or more separation and cooling systems 310. Although not shown, in one or more embodiments, the heated cooling medium can be sent to the heat recovery steam generation unit 360 and/or to the one or more steam turbines 370.

Although not shown, steam produced from cooling the hydrocarbon products within the separation and cooling system 310 can be used to control the steam to carbon monoxide ratio within the gasifier 100 and/or 200. The steam generated by cooling the hydrocarbon products within the separation and cooling system 310 can be introduced to the gasifier 100 and/or 200 via line 104. In one or more embodiments, the amount of steam introduced to the gasifier 100 and/or 200 can be based on the amount of carbon monoxide present in the combustion gas and/or the gasified hydrocarbons. In one or more embodiments, at least a portion of the steam generated by cooling the hydrocarbon products can be used in a steam assisted gravity drainage process. In one or more embodiments, a steam assisted gravity drainage process can provide one or more hydrocarbons, for example heavy crude oil and bitumen.

In one or more embodiments, the product separation and the product cooling can occur in either order. In one or more embodiments, the products can first be cooled and then separated to provide the hydrocarbon products, such as methane, ethane, propane, and butane via line 311 and the syngas via line 315. The sequence of product separation and cooling can be determined by process conditions, available equipment, and economic factors. In one or more embodiments, at least a portion of the hydrocarbon products via line 311 can be further processed ("upgraded") into more valuable products or sold (not shown).

The syngas in line 315 can contain about 80% vol or more, about 85% vol or more, about 90% vol or more, or about 95% vol or more hydrogen, carbon monoxide, and carbon dioxide. The syngas in line 315 can contain about 75% vol or more carbon monoxide and hydrogen with the balance being primarily carbon dioxide and methane. The carbon monoxide content of the syngas in line 315 can range from a low of about 10% vol, about 20% vol, or about 30% vol to a high of about 50% vol, about 70% vol or about 85% vol. The hydrogen content of the syngas in line 315 can range from a low of about 1% vol, about 5% vol, or about 10% vol to a high of about 30% vol, about 40% vol or 5 about 0% vol. The hydrogen content of the syngas in line 315 can range from about 20% vol to about 30% vol. The syngas in line 315 can contain less than about 25% vol, less than about 20% vol, less than about 15% vol, less than about 10% vol, or less than about 5% vol of combined nitrogen, methane, carbon dioxide, water, hydrogen sulfide, and hydrogen chloride. The syngas in line 315 can contain less than about 25% vol, less than about 20% vol, less than about 15% vol, less than about 10% vol, or less than about 5% vol of combined methane, carbon dioxide, water, hydrogen sulfide, and hydrogen chloride The carbon dioxide concentration in the syngas can be about 25% vol or less, 20% vol or less, 15% vol or less, 10% vol or less, 5% vol or less, 3% vol or less, 2% vol or less, or 1% vol or less. The methane concentration in the syngas in line 315 can be about 15% vol or less, 10% vol or less, 5% vol or less, 3% vol or less, 2% vol or less, or 1% vol or less. The water concentration in the syngas in line 315 can be about 40% vol or less, 30% vol or less, 20% vol or less, 10% vol or less, 5% vol or less, 3% vol or less, 2% vol or less, or 1% vol or less. The syngas in line 315 can be nitrogen-free or essentially nitrogen-free, e.g. containing less than 0.5% vol nitrogen.

The heating value of the syngas in line 315, corrected for heat losses and dilution effects, can range from about 1,850 kJ/m$^3$ to about 2,800 kJ/m$^3$, about 1,850 kJ/m$^3$ to about 3,730 kJ/m$^3$, about 1,850 kJ/m$^3$ to about 4,100 kJ/m$^3$, about 1,850 kJ/m$^3$ to about 5,200 kJ/m$^3$, about 1,850 kJ/m$^3$ to about 6,700 kJ/m$^3$, about 1,850 kJ/m$^3$ to about 7,450 kJ/m$^3$, about 1,850 kJ/m$^3$ to about 9,300 kJ/m$^3$, or about 1,850 kJ/m$^3$ to about 10,250 kJ/m$^3$.

In one or more embodiments, the temperature of the syngas in line 315 can be further reduced using one or more secondary coolers (not shown) to provide a cooler syngas. The temperature of the cooler syngas can range from about 50° C. to about 300° C. or from about 150° C. to about 350° C. Although not shown, at least a portion of the syngas in line 315 can be recycled for use as a carrier fluid for the hydrocarbon in line 102, see FIGS. 1 and/or 2.

In one or more embodiments, at least a portion of the syngas in line 315 can be introduced to one or more syngas purification systems 320. The one or more syngas purification systems 320 can remove contaminants to provide a waste gas via line 323 and a treated syngas via line 321. The one or more syngas purification systems 320 can include one or more systems, processes, or devices to remove contaminants including, but not limited to, sulfur, sulfur containing compounds, mercury, mercury containing compounds, arsenic, selenium, cadmium, nickel, vanadium, and/or carbonyl sulfide from the syngas in line 315. In one or more embodiments, the syngas purification system 320 can be a catalytic purification system, including, but not limited to, one or more systems which can include zinc titanate, zinc ferrite, tin oxide, zinc oxide, iron oxide, copper oxide, cerium oxide, derivatives thereof, mixtures thereof, or combinations thereof. In one or more embodiments, the one or more syngas purification systems 320 can be a process-based purification system, including, but not limited to, one or more systems using the Selexol™ process, the Rectisol® process, the CrystaSulf® process, and the Sulfinol® Gas Treatment Process, or any combination thereof. In one or more embodiments, the one or more syngas purification systems 320 can be a combination of one or more catalytic and one or more process-based purification systems.

In one or more embodiments, one or more amine solvents such as monoethanolamine ("MEA"), diethanolamine ("DEA"), triethanolamie ("TEA"), potassium carbonate, methyldiethanolamine ("MDEA"), diglycolamine ("DGA"), diisopropanolamine ("DIPA"), derivatives thereof, mixtures thereof, or any combination thereof., can be used within the one or more syngas purification systems 320 to remove acid gases from the cooled, separated, syngas via line 315. If the syngas via line 315 contains carbonyl sulfide (COS), the carbonyl sulfide can be converted by hydrolysis to hydrogen sulfide by reaction with water over a catalyst and then absorbed using one or more of the methods described above. If the syngas in line 315 contains one or more heavy metals, for example mercury and/or cadmium, a bed of sulfur-impregnated activated carbon, active metal sorbents, such as iridium, palladium, ruthenium, platinum, alloys thereof, combinations thereof, or any other known heavy metal removal technology can be used to remove the one or more heavy metals.

In one or more embodiments, a cobalt-molybdenum ("Co—Mo") catalyst can be incorporated into the one or more syngas purification systems 320 to perform a sour shift conversion of the syngas in line 315. (i.e. the conversion of carbon monoxide to carbon dioxide in the presence of hydrogen sulfide) The Co—Mo catalyst can operate at a temperature of about 290° C. in the presence of hydrogen sulfide ($H_2S$), such as about 100 ppmw $H_2S$. If a Co—Mo catalyst is used to perform a sour shift within the syngas purification system 320, subsequent downstream removal of sulfur and/or sulfur-containing compounds from the shifted syngas can be accomplished using any of the above described sulfur removal methods and/or techniques.

In one or more embodiments, the syngas purification system 320 can include one or more gas converters, for example one or more shift reactors, which can convert at least a portion of the carbon monoxide present in the treated syngas in line 315 to carbon dioxide via a water-gas shift reaction, to adjust the hydrogen ($H_2$) to carbon monoxide (CO) ratio ($H_2$:CO) of the syngas to provide a syngas in line 321 containing shifted syngas. In one or more embodiments, the carbon dioxide can be removed via line 323 to provide a syngas lean in carbon dioxide, e.g. less than about 2% vol carbon dioxide.

In one or more embodiments, at least a portion of the treated syngas in line 321 can be removed via line 327 and sold as a commodity. In one or more embodiments, at least a portion of the treated syngas in line 321 can be introduced via line 325 to the one or more gas converters 330 to provide one or more products via line 331, which can include, but are not limited to, Fischer-Tropsch products, methanol, ammonia, asphaltene-rich mixtures, derivatives thereof, or combinations thereof. In one or more embodiments, at least a portion of the one or more products or converted syngas in line 331 can be sold or upgraded using further downstream processes (not shown), which can be introduced via line 333

In one or more embodiments, at least a portion of the treated syngas in line 321 can be introduced to one or more hydrogen separators 335 via line 341 to provide a hydrogen-rich gas via line 337. In one or more embodiments, at least a portion of the treated syngas via line 321 can be combusted in one or more combustors 345 to provide an exhaust gas. The exhaust gas via line 347 can be introduced to the one or more turbines 350 to produce or generate mechanical power, electrical power and/or steam. In one or more embodiments, at least a portion of the hydrogen-rich gas via line 337 can be introduced to the one or more combustors via line 321 in addition to or in place of the treated syngas.

The one or more gas converters 330 can include one or more shift reactors, which can convert at least a portion of the carbon monoxide present in the treated syngas in line 325 to carbon dioxide via a water-gas shift reaction, to adjust the hydrogen ($H_2$) to carbon monoxide (CO) ratio ($H_2$:CO) of the syngas to provide a product in line 331 containing shifted syngas.

In one or more embodiments, the one or more shift reactors within the gas converter 330 can include, but are not limited to, single stage adiabatic fixed bed reactors; multiple-stage adiabatic fixed bed reactors with or without interstage cooling; steam generation or cold quench reactors; tubular fixed bed reactors with steam generation or cooling; fluidized bed reactors; or any combination thereof. In one or more embodiments, a sorption enhanced water-gas shift (SEWGS) process, utilizing a pressure swing adsorption unit having multiple fixed bed reactors packed with shift catalyst and operated at a high temperature of approximately 475° C. can be used.

In at least one specific embodiment, the one or more gas converters 330 can include two shift reactors arranged in series. A first reactor can be operated at high temperature of from about 300° C. to about 450° C. to convert a majority of the carbon monoxide present in the treated syngas introduced via line 325 to carbon dioxide at a relatively high reaction rate using an iron-chrome catalyst. A second reactor can be operated at a relatively low temperature of from about 150° C. to about 225° C. to further convert remaining carbon monoxide to carbon dioxide using a mixture of copper oxide and zinc oxide. In one or more embodiments, a medium temperature shift reactor can be used in addition to, in place of, or in combination with, the high temperature shift reactor and/or low temperature shift reactor. The medium temperature shift reactor can be operated at a temperature of from about 250° C. to about 300° C.

In one or more embodiments, the carbon dioxide provided from the one or more gas converters 320 can be separated, adsorbed, or otherwise removed from the product in line 331. Suitable carbon dioxide adsorbents and absorption techniques include, but are not limited to, propylene carbonate physical adsorbent; alkyl carbonates; dimethyl ethers of polyethylene glycol of two to twelve glycol units (Selexol™ process); n-methyl-pyrrolidone; sulfolane; and/or use of the Sulfinol® Gas Treatment Process. In one or more embodiments, carbon dioxide recovered from the treated syngas in line 325 can be used to enhance the wellhead production and recovery of crude oil and gas. In an illustrative hydrocarbon production process, carbon dioxide recovered from the treated syngas in line 325 can be injected into, and flushed through, an area beneath an existing hydrocarbon production well where one or more "stranded" hydrocarbon deposits exist.

In one or more embodiments, one of the one or more gas converters 330 can be used to produce one or more Fischer-Tropsch ("F-T") products, including refinery/petrochemical asphaltene-rich mixtures, transportation fuels, synthetic crude oil, liquid fuels, lubricants, alpha olefins, waxes, and the like. The F-T reaction can be carried out in any type reactor, for example, through the use of fixed beds; moving beds; fluidized beds; slurries; bubbling beds, or any combination thereof. The F-T reaction can employ one or more catalysts including, but not limited to, copper-based; ruthenium-based; iron-based; cobalt-based; mixtures thereof, or any combination thereof. The F-T reaction can be carried out at temperatures ranging from about 190° C. to about 450° C. depending on the reactor configuration. Additional reaction and catalyst details can be found in U.S. Patent Publication No. 2005/0284797 and U.S. Pat. Nos. 5,621,155; 6,682,711; 6,331,575; 6,313,062; 6,284,807; 6,136,868; 4,568,663; 4,663,305; 5,348,982; 6,319,960; 6,124,367; 6,087,405; 5,945,459; 4,992,406; 6,117,814; 5,545,674; and 6,300,268.

Fischer-Tropsch products including liquids which can be further reacted and/or upgraded to a variety of finished hydrocarbon products can be produced within the gas converter 330. Certain products, e.g. $C_4$-$C_5$ hydrocarbons, can include high quality paraffin solvents which, if desired, can be hydrotreated to remove olefinic impurities, or employed without hydrotreating to produce a wide variety of wax products. Liquid hydrocarbon products, containing $C_{16}$ and higher hydrocarbons can be upgraded by various hydroconversion reactions, for example, hydrocracking, hydroisomerization, catalytic dewaxing, isodewaxing, or combinations thereof. The converted $C_{16}$ and higher hydrocarbons can be used in the production of mid-distillates, diesel fuel, jet fuel, isoparaffinic solvents, lubricants, drilling oils suitable for use in drilling muds, technical and medicinal grade white oil, chemical raw materials, and various hydrocarbon specialty products.

In at least one specific embodiment, at least one of the one or more gas converters 330 can include one or more Fischer-Tropsch slurry bubble column reactors. In one or more embodiments, the catalyst within the slurry bubble column reactors can include, but is not limited to, a titania support impregnated with a salt of a catalytic copper or an Iron Group metal, a polyol or polyhydric alcohol and, optionally, a rhenium compound or salt. Examples of polyols or polyhydric alcohols include glycol, glycerol, derythritol, threitol, ribitol arabinitol, xylitol, allitol, dulcitol, gluciotol, sorbitol, and mannitol. In one or more embodiments, the slurry bubble column reactors can operate at a temperature of less than 220° C. and from about 100 kPa to about 4,150 kPa, or about 1,700 kPa to about 2,400 kPa using a cobalt (Co) catalyst promoted with rhenium (Re) and supported on titania having a Re:Co weight ratio in the range of about 0.01 to about 1 and containing from about 2% wt to about 50% wt cobalt.

In one or more embodiments, the one or more Fischer-Tropsch slurry bubble column reactors within the gas converter 330 can use a catalytic metal, such as, copper or an iron group metal within a concentrated aqueous salt solution, for example cobalt nitrate or cobalt acetate. The resultant aqueous salt solution can be combined with one or more polyols, or optionally perrhenic acid, while adjusting the amount of water to obtain approximately 15 wt% cobalt in the solution. Incipient wetness techniques can be used to impregnate the catalyst onto a rutile or anatase titania support, optionally spray-dried, and calcined. This method reduces the need for rhenium promoter within the F-T reactor. Additional details can be found in U.S. Pat. Nos. 5,075,269 and 6,331,575.

In one or more embodiments, the one or more gas converters 330 can produce ammonia, using the Haber-Bosch process. In one or more embodiments, the one or more gas converters 330 can be used for the production of alkyl-formates, for example, the production of methyl formate. Any of several alkyl-formate production processes can be used within the gas converter 330, for example a gas or liquid phase reaction between carbon monoxide and methanol occurring in the presence of an alkaline, or alkaline earth metal methoxide catalyst. Additional details can be found in U.S. Pat. Nos. 3,716,619; 3,816,513; and 4,216,339.

In one or more embodiments, at least one of the one or more gas converters 330 can be used to produce methanol, dimethyl ether, ammonia, acetic anhydride, acetic acid, methyl acetate, acetate esters, vinyl acetate and polymers, ketenes, formaldehyde, dimethyl ether, olefins, derivatives thereof, or combinations thereof. For methanol production, for example, the Liquid Phase Methanol Process can be used (LPMeOH™). In this process, at least a portion of the carbon monoxide in the syngas introduced via line 325 can be directly converted into methanol using a slurry bubble column reactor and catalyst in an inert hydrocarbon oil reaction medium. The inert hydrocarbon oil reaction medium can conserve heat of reaction while idling during off-peak periods for a substantial amount of time while maintaining good catalyst activity. Additional details can be found in U.S. 2006/0149423 and prior published Heydorn, E. C., Street, B. T., and Kornosky, R. M., "Liquid Phase Methanol (LPMeOH™) Project Operational Experience," (Presented at the Gasification Technology Council Meeting in San Francisco on Oct. 4-7, 1998). Gas phase processes for producing methanol can also be used. For example, known processes using copper based catalysts, the Imperial Chemical Industries process, the Lurgi process and the Mitsubishi process can be used.

In one or more embodiments, at least a portion of the carbon monoxide in the treated syngas in line 325 can be separated in the gas converter 330 and recovered as a carbon monoxide-rich gas (not shown). Recovered carbon monoxide can be used in the production of one or more commodity and/or specialty chemicals, including, but not limited to, acetic acid, phosgene, isocyanates, formic acid, propionic acid, mixtures thereof, derivatives thereof, and/or combinations thereof. Although not shown, the carbon monoxide-rich gas from the gas converter 330 can be used to provide at least a portion of the carrier fluid, which can be introduced to the hydrocarbon in line 102, see FIGS. 1 and 2.

In one or more embodiments, at least a portion of the treated syngas via line 321 can be introduced to one or more hydrogen separators 335 via line 341 to provide a hydrogen-rich gas via line 337. In one or more embodiments, at least a portion of the converted syngas via line 331 can also be directed to the one or more hydrogen separators 335 to provide the hydrogen-rich gas via line 337. In one or more embodiments, the one or more hydrogen separators 335 can include any system or device to selectively separate hydrogen from mixed gas stream to provide purified hydrogen via line 335 and one or more waste gases via line 339. In one or more embodiments, the hydrogen separators 335 can utilize one or more gas separation technologies including, but not limited to, pressure swing absorption, cryogenic distillation, semi-permeable membranes, or any combination thereof. Suitable absorbents can include caustic soda, potassium carbonate or other inorganic bases, and/or alanolamines.

In one or more embodiments, the one or more hydrogen separators 335 can provide a carbon dioxide-rich waste gas via line 339, and a hydrogen-rich product via line 337. In one or more embodiments, at least a portion of the hydrogen-rich product via line 337 can be used as a feed to one or more fuel cells 340. In one or more embodiments, at least a portion of the hydrogen-rich product via line 337 can be combined with at least a portion of the treated syngas in line 321 prior to use as a fuel in the one or more combustors 345. Although not shown, at least a portion of the hydrogen-rich product via line 337 can be recycled to line 102, see Figures 1 and 2, to provide at least a portion of the carrier fluid. In one or more embodiments, the hydrogen-rich product in line 337 can be used in one or more downstream operations, which can include, but are not limited to, hydrogenation processes, fuel cell energy processes, ammonia production, and/or hydrogen fuel. For example, the hydrogen-rich product in line 337 can be used to make electricity using one or more hydrogen fuel cells 340.

In one or more embodiments, at least a portion of the treated syngas in line 321 can be combined with one or more oxidants introduced via line 343 and combusted in one or more combustors 345 to provide a high pressure/high temperature exhaust gas via line 347. The exhaust gas in line 347 can be passed through one or more turbines 350 and/or heat recovery systems 360 to provide mechanical power, electrical power and/or steam. The exhaust gas via line 347 can be introduced to one or more gas turbines 350 to provide an exhaust gas via line 351 and mechanical shaft power to drive the one or more electric generators 355. The exhaust gas via line 351 can be introduced to one or more heat recovery systems 360 to provide steam via line 362. In one or more embodiments, a first portion of the steam via line 362 can be introduced to one or more steam turbines 370 to provide mechanical shaft power to drive one or more electric generators 375. In one or more embodiments, a second portion of the steam via line 104 can be introduced to the gasifier, see FIGS. 1 and 2, and/or other auxiliary process equipment (not shown). In one or more embodiments, lower pressure steam from the one or more steam turbines 370 can be recycled to the one or more heat recovery systems 360 via line 377. In one or more embodiments, residual heat from line 377 can be rejected to a condensation system well known to those skilled in the art or sold to local industrial and/or commercial steam consumers.

In one or more embodiments, the heat recovery system 360 can be a closed-loop heating system, e.g. a waste heat boiler, shell-tube heat exchanger, and the like, capable of exchanging heat between the exhaust gas introduced via line 351 and the lower pressure steam introduced via line 377 to produce steam via line 362. In one or more embodiments, the heat recovery system 360 can provide up to 10,350 kPa, 600° C. superheat/reheat steam without supplemental fuel.

Figure 4:
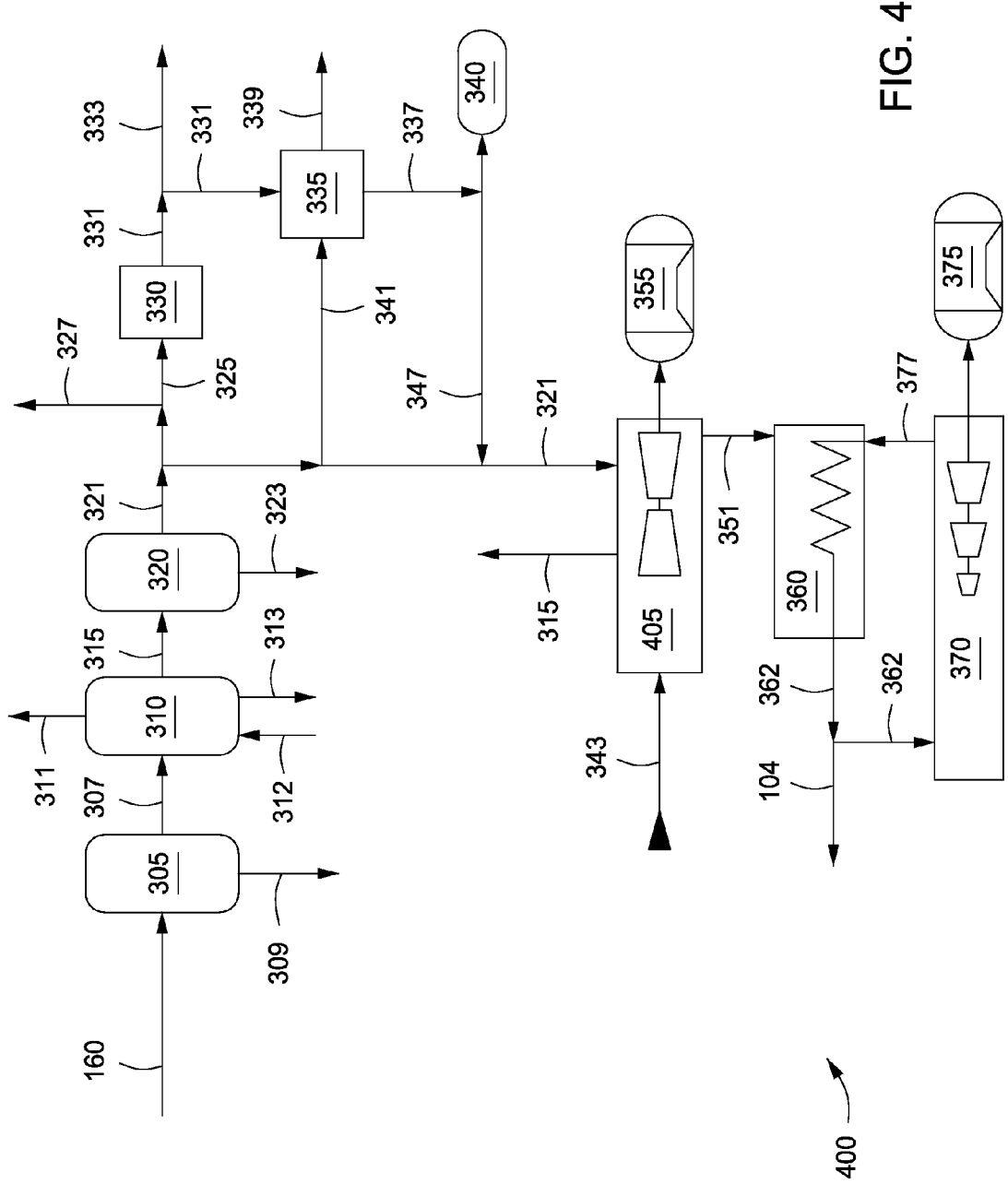
FIG. 4 depicts another illustrative hydrocarbon upgrading system according to one or more embodiments described.

FIG. 4 depicts another illustrative hydrocarbon upgrading system 400 for upgrading a hot product gas according to one or more embodiments. In one or more embodiments, the hydrocarbon upgrading system 400 can include one or more combustion turbines 405 to further enhance energy efficiency of the gasification system. The one or more particulate removal systems 305, one or more product separation and/or cooling systems 310, one or more syngas purification systems 320, one or more gas converters 330, one or more hydrogen separators 335, one or more heat recovery systems 360, one or more steam turbines 375, one or more generators 355, 375 can be as discussed and discussed above in reference to FIG. 3. In one or more embodiments, the gasification system 400 can include the one or more combustion turbines 305 in place of or in addition to the one or more combustors 345 and one or more gas turbines 350 depicted in FIG. 3. In one or more embodiments, the oxidant introduced to the gasifier via line 106 or 215 can be as discussed and described above with reference to FIGS. 1 and 2. In one or more embodiments, the hot product gas via line 160 can be as discussed and described above with reference to FIGS. 1-3.

In one or more embodiments, the treated syngas in line 321 can be introduced to the one or more combustion turbines 405. In one or more embodiments, the treated syngas in line 321 can be mixed with the hydrogen-rich product via line 337 and introduced to the one or more combustion turbines 405. The one or more combustion turbines 405 can produce a high temperature exhaust gas via line 351 and shaft power to drive the one or more generators 355. In one or more embodiments, heat from the combustion turbine exhaust gas, generally about 600° C. can be recovered using the one or more heat recovery systems 360 to generate steam via line 362 for subsequent use in a steam turbine 370 and/or gasifier, not shown.

In one or more embodiments, ambient air via line 343 can be compressed within a compressor stage of the combustion turbine 405 to provide compressed air via line 415, which can be introduced to the gasifier 45 and/or the ASU 210, see FIGS. 1 and 2. In one or more embodiments, at least a portion of a nitrogen-rich waste gas produced via line 206 (see FIG. 2) can be purged, sold as a commodity, and/or at least a portion can be introduced to the one or more combustion turbines 405 to reduce nitrogen oxide ($NO_x$) emissions by lowering the combustion temperature in the combustion turbine 405. Within the combustion turbine 405, the nitrogen can act as a diluent with no heating value, i.e. a heat sink. To further minimize $NO_x$ formation, the syngas and/or syngas and hydrogen mixture via line 321 entering the one or more combustion turbines 405 can be saturated with water (not shown).

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for processing hydrocarbons comprising:
vaporizing a portion of a hydrocarbon in the presence of gasified hydrocarbons, hydrogen, combustion gas, and solids to provide a vaporized gas;
cracking a portion of the hydrocarbon in the presence of the gasified hydrocarbons, the hydrogen, the combustion gas, and the solids to provide a cracked gas;
depositing a portion of the hydrocarbon onto the solids to provide hydrocarbon containing solids;
selectively separating at least a portion of the hydrocarbon containing solids to provide separated hydrocarbon containing solids and a hot gas product, wherein the hot gas product comprises the vaporized gas, the cracked gas, the gasified hydrocarbons, the hydrogen, and the combustion gas, and wherein the hot gas product is at a temperature of from about 400° C. to about 1,650° C.;
combusting a portion of the hydrocarbon containing solids in the presence of an oxidant to provide the combustion gas; and
gasifying a portion of the hydrocarbon containing solids to provide the gasified hydrocarbons and the hydrogen.

2. The method of claim 1, further comprising indirectly transferring heat from the hot gas product to boiler feed water to provide steam and a cooled gas product.

3. The method of claim 2, further comprising selectively separating the cooled gas product to provide at least one of ethane, ethylene, propane, propylene, butane, butene, pentane, pentene, hexane, hexene, heptane, and heptene.

4. The method of claim 2, further comprising selectively separating the cooled gas product to provide one or more hydrocarbon products and a syngas, wherein the one or more hydrocarbon products comprise $C_1$ to $C_{12}$ hydrocarbons, and wherein the syngas comprises hydrogen, carbon monoxide, and carbon dioxide; and reacting at least a portion of the syngas to provide one or more Fischer-Tropsch products, ammonia, methanol, derivatives thereof, or combinations thereof.

5. The method of claim 1, wherein the hydrocarbon is a liquid.

6. The method of claim 1, wherein the hydrocarbon comprises whole crude oil, crude oil, vacuum gas oil, heavy gas oil, residuum, atmospheric tower bottoms, vacuum tower bottoms, distillates, paraffins, aromatic hydrocarbons, naphthenes, oil shales, oil sands, tars, bitumens, kerogen, waste oils, derivatives thereof, or mixtures thereof.

7. The method of claim 1, wherein the solids comprise refractory oxides, rare earth modified refractory oxides, alkali earth metal refractory oxides, ash, or mixtures thereof.

8. The method of claim 1, wherein the residence time of the hydrocarbon within the gasification zone ranges from about 50 milliseconds to about 5 seconds.

9. The method of claim 1, wherein the vaporized gas, cracked gas, or both comprise more than 1% vol $C_1$-$C_3$ hydrocarbons, more than 5% vol $C_4$-$C_6$ hydrocarbons, and more than 1% vol $C_7$-$C_9$ hydrocarbons.

10. The method of claim 1, wherein the amount of oxidant present is from about 1% to about 50% of the stoichiometric oxygen required to oxidize the total amount of hydrocarbons deposited on the hydrocarbon containing solids.

11. The method of claim 1, wherein vaporizing the portion of the hydrocarbon, cracking the portion of the hydrocarbon, depositing the portion of the hydrocarbon onto the solids, combusting the portion of the hydrocarbon containing solids, and gasifying the portion of the hydrocarbon containing solids all occur within a single riser of a gasifier.

12. The method of claim 1, wherein the solids are substantially inert at process conditions.

13. The method of claim 1, wherein the solids are substantially non-reactive at process conditions.

14. The method of claim 1, wherein vaporizing the portion of the hydrocarbon uses heat generated by combusting the portion of the hydrocarbon.

15. A method for processing hydrocarbons comprising:
vaporizing a portion of a hydrocarbon in the presence of gasified hydrocarbons, hydrogen, combustion gas, and solids in a gasification zone to provide a vaporized gas;
cracking a portion of the hydrocarbon in the presence of the gasified hydrocarbons, the hydrogen, the combustion gas, and the solids in the gasification zone to provide a cracked gas;
depositing a portion of the hydrocarbon onto the solids in the gasification zone to provide hydrocarbon containing solids;
selectively separating at least a portion of the hydrocarbon containing solids in a separation zone to provide separated hydrocarbon containing solids and a hot gas product, wherein the hot gas product comprises the vaporized gas, the cracked gas, the gasified hydrocarbons, the hydrogen, and the combustion gas, and wherein the hot gas product is at a temperature of from about 400° C. to about 1,650° C.;
combusting a portion of the hydrocarbon containing solids in the presence of an oxidant in an oxidation zone to provide the combustion gas, wherein the amount of oxidant present is from about 1% to about 50% of the stoichiometric oxygen required to oxidize the total amount of hydrocarbons deposited on the hydrocarbon containing solids; and
gasifying a portion of the hydrocarbon containing solids in the gasification zone to provide the gasified hydrocarbons and the hydrogen.

16. The method of claim 15, further comprising directly or indirectly transferring heat from the hot gas product in a cooling zone to boiler feed water to provide a cooled gas product.

17. The method of claim 15, further comprising selectively separating the cooled gas product to provide at least one of ethane, ethylene, propane, propylene, butane, butene, pentane, pentene, hexane, hexene, heptane, and heptene.

18. The method of claim 15, further comprising selectively separating the cooled gas product to provide one or more hydrocarbon products and syngas, wherein the one or more hydrocarbon products comprise $C_1$ to $C_{12}$ hydrocarbons, and wherein the syngas comprises hydrogen, carbon monoxide, and carbon dioxide; and reacting at least a portion of the syngas to provide one or more Fischer-Tropsch products, ammonia, methanol, derivatives thereof, or combinations thereof.

19. The method of claim 15, wherein the residence time of the hydrocarbon within the gasification zone ranges from about 50 milliseconds to about 5 seconds.

20. The method of claim 15, wherein the vaporized gas, the cracked gas, or a mixture, thereof comprise more than 5% vol $C_1$-$C_3$ hydrocarbons, more than 5% vol $C_4$-$C_6$ hydrocarbons, and more than 1% vol $C_7$-$C_9$ hydrocarbons.

21. The method of claim 15, wherein the oxidant comprises at least 99% oxygen.

22. A method for processing hydrocarbons comprising:
vaporizing a portion of a hydrocarbon in the presence of gasified hydrocarbons, hydrogen, combustion gas, and solids in a gasification zone to provide a vaporized gas, wherein the hydrocarbon has an API gravity at 15.6° C. of from about 10 to about 25;

cracking a portion of the hydrocarbon in the presence of the gasified hydrocarbons, the hydrogen, the combustion gas, and the solids in the gasification zone to provide a cracked gas comprising more than 1% vol $C_1$-$C_3$ hydrocarbons, more than 5% vol $C_4$-$C_6$ hydrocarbons, and more than 1% vol $C_7$-$C_9$ hydrocarbons;

depositing a portion of the hydrocarbon onto the solids in the gasification zone to provide hydrocarbon containing solids;

selectively separating at least a portion of the hydrocarbon containing solids in a separation zone to provide separated hydrocarbon containing solids and a hot gas product, wherein the hot gas product comprises the vaporized gas, the cracked gas, the gasified hydrocarbons, the hydrogen, and the combustion gas, and wherein the hot gas product is at a temperature of from about 400° C. to about 1,650° C.;

combusting a portion of the hydrocarbon containing solids in the presence of an oxidant in an oxidation zone to provide the combustion gas, wherein the amount of oxidant present is from about 1% to about 50% of the stoichiometric oxygen required to oxidize the total amount of hydrocarbons deposited on the hydrocarbon containing solids;

gasifying a portion of the hydrocarbon containing solids in the gasification zone to provide the gasified hydrocarbons and the hydrogen; and directly or indirectly transferring heat from the hot gas product to boiler feed water to provide a cooled gas product.

23. The method of claim 22, further comprising selectively separating the cooled gas product to provide two or more hydrocarbon products and a syngas, wherein the hydrocarbon products comprise at least two of ethane, ethylene, propane, propylene, butane, butene, pentane, pentene, hexane, hexene, heptane, and heptene, and wherein the syngas comprises hydrogen, carbon monoxide, and carbon dioxide; and reacting at least a portion of the syngas product to provide one or more Fischer-Tropsch products, ammonia, methanol, derivatives thereof, or combinations thereof.

* * * * *